(12) United States Patent
Johnston et al.

(10) Patent No.: US 9,440,823 B2
(45) Date of Patent: Sep. 13, 2016

(54) TRANSPORTABLE MACHINERY

(75) Inventors: Gary Allan Johnston, McConnellsburg, PA (US); John Fremont Benton, Smithsburg, MD (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 243 days.

(21) Appl. No.: 12/073,416

(22) Filed: Mar. 5, 2008

(65) Prior Publication Data
US 2009/0223918 A1 Sep. 10, 2009

(51) Int. Cl.
*B66C 23/62* (2006.01)
*B62D 21/02* (2006.01)

(52) U.S. Cl.
CPC ............... *B66C 23/62* (2013.01); *B62D 21/02* (2013.01)

(58) Field of Classification Search
CPC . B66C 23/78; B66C 23/80; B66C 2700/035; B66C 2700/0378; E02F 9/08; E02F 9/08; E02F 9/085; B66F 9/07559
USPC ........... 212/294, 301–306; 280/763.1, 764.1, 280/765.1, 766.1; 414/686, 722
See application file for complete search history.

(56) References Cited

U.S. PATENT DOCUMENTS

| | | | |
|---|---|---|---|
| D32,199 S * | 2/1900 | Worth | D12/159 |
| 1,409,378 A * | 3/1922 | Howard | 105/28 |
| 2,136,122 A | 11/1938 | Almdale | |
| 2,209,392 A | 7/1940 | Edwards | |
| 2,297,123 A | 9/1942 | Almdale | |
| 2,351,233 A * | 6/1944 | Schon | 280/800 |
| 2,590,787 A * | 3/1952 | Nickles | 212/301 |
| 2,653,829 A * | 9/1953 | Sheehan | 280/797 |
| 3,021,016 A * | 2/1962 | Noll et al. | 212/304 |
| 3,064,825 A * | 11/1962 | Thomas | 212/304 |
| 3,096,887 A * | 7/1963 | Thomas | 212/304 |
| 3,111,226 A * | 11/1963 | Kirsten | 212/195 |
| 3,338,426 A * | 8/1967 | Grove | 212/304 |
| 3,622,171 A * | 11/1971 | Gottschalk | 280/797 |
| 3,643,815 A * | 2/1972 | Balogh | 212/175 |
| 3,726,418 A * | 4/1973 | Short | 212/181 |
| 3,734,223 A * | 5/1973 | Anderson | 180/294 |
| 4,014,400 A * | 3/1977 | Cline et al. | 180/9.1 |
| 4,027,801 A | 6/1977 | Johnston et al. | |
| 4,160,558 A | 7/1979 | Fritsch | |
| 4,194,639 A | 3/1980 | Grove | |
| 4,276,985 A | 7/1981 | Newman | |

(Continued)

FOREIGN PATENT DOCUMENTS

DE 94 13 931 U1 3/1995
EP 1 607 363 A2 12/2005

(Continued)

OTHER PUBLICATIONS

European Search Report dated Nov. 11, 2010.

*Primary Examiner* — Sang Kim
*Assistant Examiner* — Juan Campos, Jr.
(74) *Attorney, Agent, or Firm* — Brinks Gilson & Lione; John C. Bacoch

(57) ABSTRACT

A transportable machine includes a frame that may be part of a motorized carriage and a machine for transport. The frame has, for example, one or more gaps defining an interface specially designed for engaging the machine. The machine includes elements adapted to fit within or otherwise engage the gaps of the frame. Fasteners join the machine and the frame, thus creating a transportable machine.

21 Claims, 4 Drawing Sheets

(56) References Cited

U.S. PATENT DOCUMENTS

| | | | |
|---|---|---|---|
| 4,341,276 A * | 7/1982 | Furuichi | 180/9.48 |
| 4,397,396 A * | 8/1983 | Kay et al. | 212/303 |
| 4,640,421 A | 2/1987 | Mason | |
| 4,674,770 A | 6/1987 | Inagaki | |
| 5,348,171 A | 9/1994 | Haman et al. | |
| 5,403,145 A | 4/1995 | Cradeur et al. | |
| 5,664,692 A * | 9/1997 | Sauter et al. | 212/181 |
| 5,882,039 A | 3/1999 | Beckman et al. | |
| 6,055,788 A | 5/2000 | Martin et al. | |
| 6,250,679 B1 | 6/2001 | Schnell | |
| 6,834,887 B2 | 12/2004 | Burgers | |
| 6,902,027 B2 * | 6/2005 | Soga et al. | 180/308 |
| 7,108,315 B1 | 9/2006 | McCloud | |
| 7,367,463 B2 * | 5/2008 | Maruyama | 212/231 |
| 2002/0163173 A1 | 11/2002 | Ruehl et al. | |
| 2004/0177533 A1 * | 9/2004 | Fukushima et al. | 37/347 |
| 2007/0068051 A1 * | 3/2007 | Mills et al. | 37/468 |

FOREIGN PATENT DOCUMENTS

| | | | |
|---|---|---|---|
| FR | 2 242 869 A5 | | 3/1975 |
| GB | 2 111 923 A | * | 7/1983 |
| JP | 8-142811 A | | 6/1996 |
| JP | 08-311929 A | * | 11/1996 |
| JP | 2002-193587 A | * | 7/2002 |

* cited by examiner

TRANSPORTABLE MACHINERY

BACKGROUND OF THE INVENTION

The present invention relates to structures which may be generally described as transportable machinery. This includes machinery or apparatus which has some specific function, combined with elements or structures designed for facilitating transport of the machinery. Such machinery may include, for example, pumps, compressors, machines for treating materials, cranes and other lifting devices, etc.

Such combinations are often referred to as "truck mounted machinery." This is because it is common practice to utilize a standard truck-type motor vehicle, simply place on top of the vehicle chassis a separate and distinct machine, and attach the machine to the chassis (such as by bolts or welds) so that it remains in place, simply stacked on top of the motor vehicle chassis.

Such an arrangement is generally adequate for providing for transportation of the machine. It is limited, however, by the necessity of designing machines to be compatible with existing available motor vehicles. Also, such a combination results in a total weight for the combined parts of the apparatus which is simply the sum of the weights of the individual components. The resulting configuration of a machine stacked on top of a motor vehicle is also limited by the configuration of whatever motor vehicle may be chosen/available and the configuration of whatever machine is placed on the motor vehicle. Thus, the overall height of such a combination is, at a minimum, the total of the machine height and the height of the standard motor vehicle on which it is placed.

The present invention, however, represents an improvement over such a combination of a standard motor vehicle and a separate and distinct machine merely stacked one upon the other. The present invention provides a combination of elements which constitute a transportable machine which may be lighter in weight than a substantially similar machine of conventional construction stacked atop a standard motor vehicle. The lighter weight can result in greater economy of operation, a greater capacity for the transportable machine to also carry other payloads, and perhaps other advantages. A transportable machine in accordance with the present invention may also be constructed so as to have a lower profile than a similarly constructed but conventional machine stacked atop a standard motor vehicle. By a "lower profile" it is meant that the overall height of the transportable machine is lower than the cumulative height of a similarly constructed conventional machine stacked upon a standard motor vehicle chassis. The lower height is of great importance because transportable machines must be low enough to clear under road overpasses, overhead wires, and other obstacles encountered during transport.

A transportable machine in accordance with the invention also may have a lowered center of gravity as compared to the conventional arrangements of the prior art. This provides for highly desirable stability and safety in transport of the machine over roadways.

The present invention and its advantages are accomplished in a manner which is counter-intuitive, or completely contrary to conventional thinking relating to the design of transport carriages and vehicles at least because the present invention utilizes components which are generally considered unsatisfactory for such uses, as discussed in greater detail below.

BRIEF DESCRIPTION OF THE DRAWINGS

The present invention will be described in greater detail with reference to a specific embodiment and with reference to the accompanying drawings in which.

DETAILED DESCRIPTION OF THE INVENTION

Figure 1:
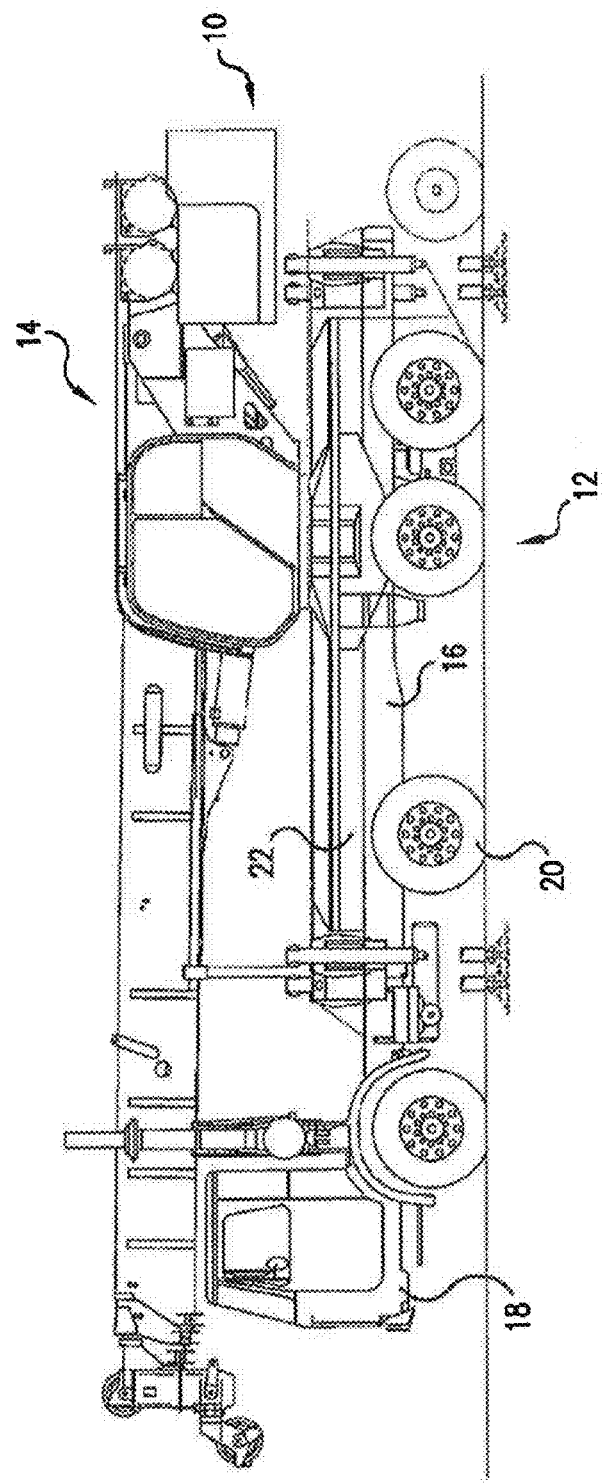
FIG. 1 is a side view of a typical transportable machine, in this exemplary embodiment a crane, mounted on a conventional motor vehicle.

Referring to FIG. 1, a conventional transportable machine is designated generally by reference numeral 10. In the exemplary embodiment shown, the transportable machine is a crane mounted on a conventional truck chassis for transport from one location to another. The combination illustrated in FIG. 1 comprises generally a motor vehicle 12 having a crane 14 mounted thereon. Motor vehicle 12 conventionally includes a chassis 16, a cab 18 mounted on the front portion of the chassis, a plurality of wheels 20 suitably arranged, and an engine and drive train (not shown) for propelling the motor vehicle.

Machine 14, in this case a crane, includes, inter alia, a machine frame or support portion 22. In conventional arrangements a frame or support portion such as shown at 22 forms a base or support for remaining parts of a machine. Typically, as illustrated, machine frame 22 is simply stacked on top of chassis 16. It is then attached by bolts, pins, welds, etc. simply so that it will not shift or slide off of the chassis.

In such a conventional arrangement, as described above, the transportable machine comprises what amounts to a set of "building blocks," one independently designed element stacked atop the other with no particular functional interaction or synergy between them, other than the fact that the machine can be transported because it is atop a motor vehicle.

The present invention, on the other hand, is not a simple combination of building blocks. Rather the invention provides a machine designed and combined in an unobvious manner with a transport carriage, and does so while providing several distinct and unobvious advantages not attainable using conventional structures or designed in a conventional manner.

Figure 2:
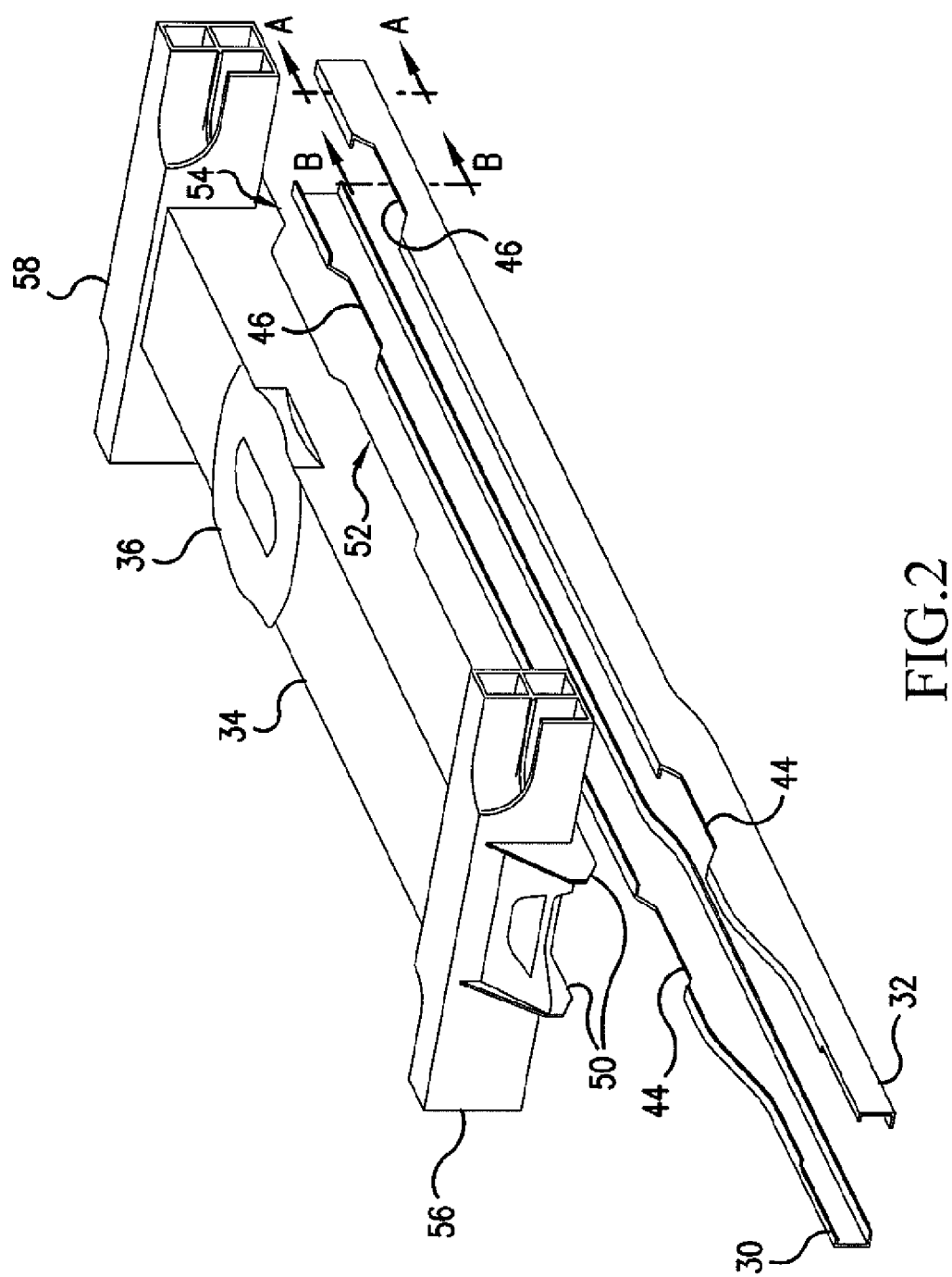
FIG. 2 is a perspective, exploded view of a portion of a machine and a frame forming part of a transport carriage in accordance with the present invention.

FIG. 2 illustrates certain parts of a transportable machine in accordance with the present invention. Certain parts illustrated in FIG. 2 are analogous to elements illustrated in FIG. 1, as discussed below. Although analogous, these parts are different from their counterparts in the prior art in significant ways, as detailed in the description below.

FIG. 2 illustrates a pair of rails 30 and 32. In the embodiment illustrated, the rails 30 and 32 would be positioned generally parallel to the direction of normal movement of a transportable carriage in substantially the same manner as components that might be found in a standard chassis 16 of FIG. 1 which extend generally along the length of the vehicle illustrated in FIG. 1.

A machine frame or support 34 illustrated in FIG. 2 is corresponds generally to frame or support 22 illustrated in FIG. 1. In the exemplary embodiment of the invention illustrated in FIG. 2, frame or support 34 is the base or "torque box" of a crane. Torque box 34 supports other elements of the crane on a bearing plate 36.

In accordance with the present invention, machine frame 34 is not of a conventional design, and is not simply stacked on top of rails 30 and 32. Rather, rails 30, 32 and machine frame 34 form parts of a unique combination that offers new and surprising advantages.

Figure 4A:
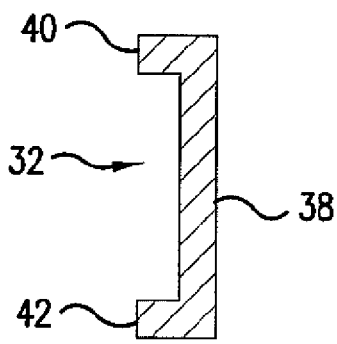
FIGS. 4A and 4B are sectional views of the exemplary frame rail of FIG. 2 taken along lines AA and BB, respectively of FIG. 2.

Rails 30 and 32 are not uniform in shape or cross section. Rather, rail 32 of the exemplary embodiment has a cross section along a major portion of its length as illustrated in FIG. 4A. As noted above, FIG. 4A is a cross section taken along line AA of FIG. 2. This cross section of rail 32 includes a vertical portion 38, an upper flange 40 and a lower flange 42.

According to the invention, this exemplary embodiment further includes modified portions, in this case gaps 44 and 46 at portions of rails 30 and 32, respectively. In the gap or notch portions, the rails have a distinctly different configuration or cross section.

Figure 4B:
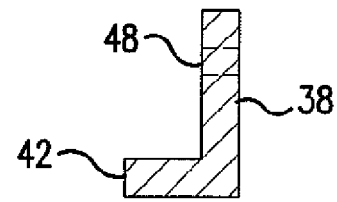

As illustrated in FIG. 4B, the configuration or cross section of the rails at the notches or gaps 44, 46 differs from the cross section at the remaining portions of the rails. FIG. 4B is a cross section of rail 32, taking at line BB of FIG. 2. As illustrated, vertical portion 38 is shorter as compared to the height of vertical portion 38 at other locations along the rail. Lower flange 42 remains, but upper flange 42 is not provided in the notch or gap portions. One or more holes 48 are provided in vertical portion 38 in the notch or gap areas for a purpose to be described in greater detail below.

The notch or gap portions provide openings or spaces in the rails. These openings or spaces can receive and accommodate a portion of a machine to be joined to the rails, the rails being associated with a carriage for transport, as will be described in greater detail below.

In the embodiment illustrated in FIG. 2, the gaps or notches are in the upper part of the rail profile. The invention is not limited to such an arrangement, however. The rail modifications, gaps or notches can also be positioned in the lower part of the rail or in a mid-portion of the rails to accommodate machinery of different designs and configurations.

Referring again to FIG. 2, machine frame 34 includes a plurality of flanges 50, 52 and 54 for attaching the machine frame, and thus the machine, to rails 30, 32. This is also illustrated in FIG. 3, a side view of the machine frame 34 attached to rail 32.

Figure 3:
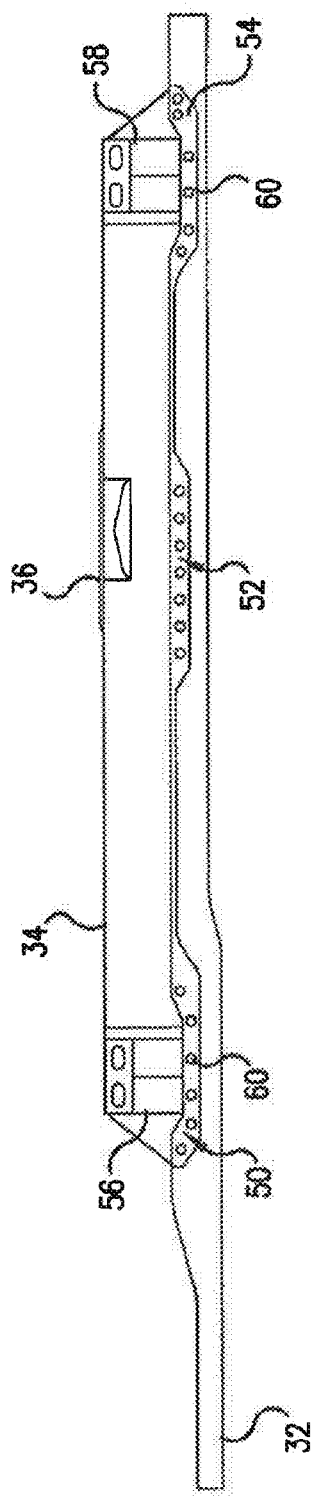
FIG. 3 is a side view of the assembled machine portion and frame of FIG. 2.

Specifically, FIG. 3 illustrates in a side view machine frame 34 attached to rails 30, 32, only rail 32 being visible in this view. Machine frame 34 is not simply sitting on top of the rails as would be the case if associated with a conventional motor vehicle. Elements of machine frame 34 are actually received within the space that would normally be occupied by conventional chassis.

Specifically, in the exemplary illustrated embodiment, the machine constructed for transport is a crane, and machine frame 34 is what is commonly called a torque box 34 that comprises a portion of the crane. Torque box 34 includes a pair of outrigger boxes 56 and 58. These house structure that supports "outriggers" or extendable stabilizing legs which are used to stabilize a crane when it is positioned in a stationary manner for lifting tasks. In the exemplary embodiment, outrigger boxes 56 and 58 fit within notches 44 and 46 of rails 30 and 32. This arrangement lowers the profile of the transportable machine, in this case a crane. This lowered profile is a highly desirable result inasmuch as transportable cranes must pass below overpasses, overhead wires, and other obstacles encountered in the course of over-the-road transportation. A lower profile enables the transportable crane to pass along more roads than would otherwise be possible if the profile was of a greater height and would encounter a broader range of obstacles normally found along roadways.

A combination in accordance with the invention also provides and allows for a lowered center of gravity of the transportable machine as compared to the prior art. A lowered center of gravity facilitates stability and safety in transport, which is of paramount importance.

Depending on the specific configuration of a crane or other machine, and of the rails that are to support the machine, the machine and/or the rails might be modified in various ways to lower the profile, lower the center of gravity, and otherwise achieve the advantages of the invention. The example of outrigger boxes fitting within the modified parts of the frame are exemplary only, and not limiting of the invention.

As illustrated in FIG. 3, machine frame 34 and rails 30, 32 are secured to each other via a plurality of fasteners 60. Fastener 60 may comprise bolts, pins, rivets or equivalent elements inserted through openings 48 in the rails 30, 32 and through corresponding openings in flanges 50, 52 and 54 of the machine frame. While bolts and the like are illustrated in the accompanying drawings, the machine frame and rails could also be secured together by other means or method, such as by welding or other fasteners or fastening methods which may be available.

Combined in this manner the machine frame 34 and rails 30, 32 provide a low profile apparatus of an advantageous configuration that includes a support structure sufficient to support the machine for transport while rails 30, 32 alone may not be adequate for that purpose. In this regard, it is noted that rails having notched, reduced or otherwise modified portions as constitute part of the invention are not normally used in any vehicle apparatus intended to bear and transport a load of significant magnitude. This is because a chassis of a motor vehicle having such reduced portions or modifications is not suitable for a vehicle intended for carrying a load.

However, in accordance with the present invention, the machine to be transported is also specially designed to interface with and attach to the specially configured rails. It is not merely carried by the rails. Rather, the machine supplements and complements the strength and rigidity of the rails, and the machine and rails together provide a unique combination that is sufficiently strong, rigid and suitable as a transportable machine.

The specially designed and equipped rails and machine frame, in combination, may be associated with a motorized or otherwise propelled carriage and thus constitute a transportable machine having the unique advantage discussed above.

In the illustrated exemplary embodiment, the reduction in height and the corresponding lowering of the center of gravity are relatively modest as the depth dimension of the illustrated notches 44, 46 is relatively modest. The invention is not limited to anything having similar dimensions, however, but encompasses rail structures and machine frame structures that have greater dimensional variations and permit larger reductions in overall height and/or reductions in other dimensions.

As noted above, a transportable machine in accordance with the present invention has a reduced weight as compared to a conventionally designed combination of an ordinary motor vehicle and ordinary machine placed atop the motor vehicle. In the illustrated exemplary embodiment, the notches or gaps 44, 46 in rails 30, 32 are relatively small. This alone would result in a relatively modest weight reduction. However, the weight reduction can be more substantial, depending on the specific design and arrangement of a particular machine and rails.

The unique combination of elements of the present invention also permits a heretofore unobtainable reduction in the mass of the rails that are to support the machine for transport. This is possible in accordance with the invention, but not in the prior art because, according to the invention, the machine is designed to supplement the strength of the rails attached thereto. As a result, the overall weight reduction of a transportable machine in accordance with the invention can be significant as compared to a corresponding machine of conventional design simply stacked upon an ordinary motor vehicle.

The present invention also facilitates a reduction in the mass of the machine frame as compared to the prior art. In an apparatus constructed in accordance with the invention the rails fastened to the machine frame strengthen and rigidify the machine frame whereby the machine frame can be of reduced mass without impairing its functionality. The prior art, in which a machine is simply stacked atop a chassis, does not enjoy this unobvious advantage.

Thus, according to the present invention, either or both of the rails and the machine frame might be constructed with significantly reduced mass as a result of the fact that the rails and machine frame complement and support each other. The illustrated embodiment is only exemplary. Depending on specifics of the rails and machine frame associated therewith, the mass of the rails and/or the machine frame might be reduced by a more substantial amount for any particular combination of rails and machine frame.

Figure 5A:
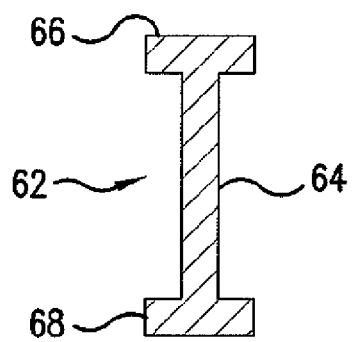
FIGS. 5A and 5B are sectional views, similar to FIGS. 4A and 4B, of an alternate exemplary embodiment of rails that may be utilized in accordance with the present invention.
Figure 5B:
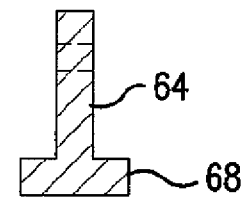

By way of additional example, and not by way of limitation, FIGS. 5A and 5B illustrate an alternate possible embodiment of rails 30, 32 in accordance with the invention. FIG. 5A illustrates an exemplary cross section of a rail as it might appear, for example, along line AA of FIG. 2. In this exemplary embodiment, rail 62 might be described as an "I" beam which includes a vertical element 64, an upper flange 66 and a lower flange 68. As illustrated in FIG. 5B, at a notch or gap portion of the rail, vertical part 64 might be shortened. Lower flange 68 remains as part of the beam in this exemplary configuration, but top flange 66 is not included.

Figure 6A:
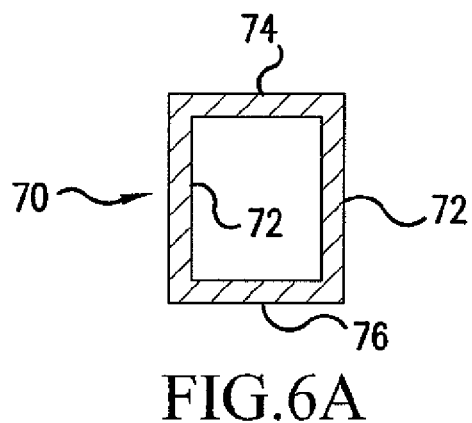
FIGS. 6A and 6B are sectional views, like FIGS. 4A and 4B, of another alternate exemplary embodiment of rails in accordance with the present invention.
Figure 6B:
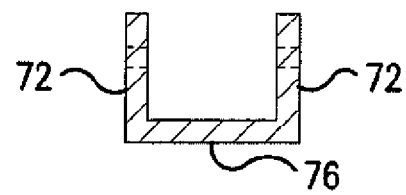

In a similar manner, FIGS. 6A and 6B illustrate yet an additional possible configuration for a rail in accordance with the present invention. As shown in FIG. 6A, exemplary rail 70 has a box-shaped cross section as it might appear, for example, along line AA in FIG. 2. Rail 70 includes two vertical portions 72, a lower horizontal portion 76 and an upper horizontal portion 74. FIG. 6B illustrates the manner in which rail 70 might be modified at a notch portion, such as at line BB in FIG. 2. At that portion, rail 70 might include lower portion 76, shortened vertical portions 72, but upper horizontal portion 74 is not provided.

The present invention is not limited to the particular embodiments and examples described above. By way of further example and not by way of limitation, the present invention encompasses additional rail configurations and variations in cross section or configuration of rails. A machine built to be transportable in accordance with the present invention might be attached not only to the upper part of rails or supports 30, 32. Support rails and a machine in accordance with the present invention may be designed so that the machine is joined to a lower part of the rails or to a mid portion of the rails, as may be dictated by specific design configurations and considerations.

We claim:
1. A combined motorized carriage and machine wherein:
a) the motorized carriage comprises an engine, a drivetrain for propelling the motorized carriage, and a frame comprising at least two spaced apart frame members extending in a generally horizontal direction, the frame members each having a frame profile with an outside perimeter and being interconnected parts of a chassis independent of the machine;
b) said at least two frame members each having a cross section that varies along said horizontal direction and each comprising first portions that have a first cross section and at least one second portion that has a second cross section;
c) said at least one second portion defining a gap in each of said at least two frame members, said gap being positioned along the outside perimeter of the frame profile of said frame members, said second cross section at each said gap defining an interface engaging the machine;
d) said machine including one or more outriggers each comprising an outrigger housing and an extendable stabilizing leg, wherein one or more portions of the outrigger housing of said one or more outriggers provide machine elements that fit within and bridge each said gap in the motorized carriage frame members and flanges for overlapping a part of said motorized carriage frame members in the vicinity of said one or more gaps; and
e) a connection between the machine and the motorized carriage frame member at each said gap to secure the machine to said frame members, the connection comprising comprises bolts engaging said flanges and engaging said frame members.
2. A combined motorized carriage and machine as in claim 1, wherein said connection makes the frame more rigid than the frame would be if the machine elements were not connected.
3. A combined motorized carriage and machine as in claim 1, wherein said connection increases the load bearing capacity of the frame compared to the load bearing capacity of the frame without the machine elements connected.
4. A combined motorized carriage and machine as in claim 1, wherein fitting said elements of said machine within said gap in each of said at least two frame members lowers the position of said machine with respect to said frame, thereby lowering the center of gravity of the transportable machine compared to where the center of gravity would be if the machine were placed on an identical frame but without the gaps.
5. A combined motorized carriage and as in claim 1, wherein fitting said elements of said machine within said gap in each of said at least two frame members lowers the position of said machine with respect to said frame, thereby lowering the height of the transportable machine compared to the height the machine would have if the machine were placed on an identical frame but without the gaps.

6. A combined motorized carriage and machine as in claim 1, wherein fitting said elements of said machine within said gap in each of said at least two frame members lowers the position of said machine with respect to said frame, thereby lowering a profile of the transportable machine compared to the profile the transportable machine would have if the machine were placed on an identical frame but without the gaps.

7. A combined motorized carriage and machine as in claim 1, wherein said gaps comprise areas with reduced height of the frame member cross-section.

8. A combined motorized carriage and machine as in claim 1, wherein said one or more outriggers extend in a direction perpendicular to the at least two frame members.

9. A combined motorized carriage and machine as in claim 1, wherein said one or more outriggers extend in a horizontal direction.

10. A combined motorized carriage and machine as in claim 1, wherein said motorized carriage is a motor vehicle and comprises a cab mounted on the front portion of the chassis and a plurality of wheels.

11. A combined motorized carriage and machine as in claim 1, wherein each of said at least two frame members comprises a beam, said first portions having multiple beam segments forming said first cross section, and said second cross section in said at least one second s portion comprising fewer beam segments than said first cross section to form said gaps.

12. A combined motorized carriage and machine as in claim 11, wherein said first portions comprise an I-shaped cross section, and said at least one second portion comprises a part of said I-shaped cross section.

13. A combined motorized carriage and machine as in claim 11, wherein said first portions comprise a box-shaped cross section, and said at least one second portion comprises a Ushaped cross section.

14. A combined motorized carriage and machine as in claim 11, wherein said first portions comprise a C-shaped cross section, and said at least one second portion comprises an L-shaped cross section.

15. A combined motorized carriage and machine as in claim 1, wherein said machine is a crane.

16. A combined motorized carriage and machine as in claim 15, wherein said one or more outriggers comprise a plurality of outriggers for stabilizing the crane during operation thereof, and said gap in each of said at least two frame members comprise a plurality of gaps at least equal in number to the number of outriggers.

17. A combined motorized carriage and machine as in claim 1, wherein said gap in each of said at least two frame members comprise a plurality of gaps, and each gap comprises a notch in the upper portions of each of the at least two motorized carriage frame members, said machine elements that fit within said gaps comprise portions that fit within said notches, and fasteners connect said machine portions and said frame members at said notches.

18. A combined motorized carriage and machine comprising:
a) a motor driven carriage portion and a machine portion;
b) the motor driven carriage portion including an engine, a drivetrain for propelling the motorized carriage, and a frame for supporting said machine portion on said motor driven carriage portion, the frame comprising at least two spaced apart frame members extending in a generally horizontal direction, the frame members being interconnected parts of a chassis independent of the machine;
c) each frame member having a frame profile with an outside perimeter and comprising a first frame part having a first cross section;
d) each frame member further comprising a second frame part having a second cross section different from said first cross section, said second cross section defining a gap in the frame member positioned along the outside perimeter of said frame profile of said frame member, said second cross section at each said gap defining an interface engaging the machine;
e) said machine portion including at least one outrigger and flanges for overlapping a part of said frame members in the vicinity of said one or more gaps, said at least one outrigger comprising an outrigger housing and an extendable stabilizing leg, wherein a portion of the outrigger housing of said at least one outrigger constitutes a frame supplementing element for connection at said gap to said second frame part for supplementing the strength and rigidity of said frame of said motor driven carriage portion; and
f) a connection between said frame supplementing element of said machine portion and the first frame part and the second frame part for securing the frame supplementing element of the machine portion to the first frame part and to the second frame part, said connection between said frame parts and said frame supplementing element increasing the strength and rigidity of said frame of the motor driven carriage portion and comprising comprises bolts engaging said flanges and engaging said frame members.

19. A combined motorized carriage and machine as in claim 18, wherein said second frame part is contiguous with said first frame part.

20. A combined motorized carriage and machine as in claim 19, wherein said second frame part has a smaller cross section than said first frame part.

21. A combined motorized carriage and machine wherein:
a) the motorized carriage comprises an engine, a drivetrain for propelling the motorized carriage, and a frame comprising at least one frame member extending in a generally horizontal direction;
b) said at least one frame member having a cross section along a portion of a length along said at least one frame member that includes a vertical portion and a horizontal portion on top of said vertical portion, with a section of the horizontal portion being removed to create a gap defining an interface engaging the machine;
c) said machine including one or more outriggers each comprising an outrigger housing and an extendable stabilizing leg, wherein one or more portions of said housing provide machine elements that fit within and bridge the gap in the motorized carriage frame members; and
d) a connection between the machine and the motorized carriage frame at each said gap to secure the machine to said frame, wherein said connection comprises fasteners comprising bolts engaging said frame and engaging said machine.

* * * * *